(12) United States Patent
Sugawara et al.

(10) Patent No.: US 8,003,273 B2
(45) Date of Patent: Aug. 23, 2011

(54) POLYMER ELECTROLYTE FUEL CELL AND FUEL CELL SEALING MEMBER FOR THE SAME

(75) Inventors: Yasushi Sugawara, Osaka (JP); Takayuki Urata, Hyogo (JP); Junji Morita, Osaka (JP); Soichi Shibata, Osaka (JP); Takahiro Umeda, Nara (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 11/917,965

(22) PCT Filed: Jul. 10, 2006

(86) PCT No.: PCT/JP2006/313676
§ 371 (c)(1),
(2), (4) Date: Dec. 18, 2007

(87) PCT Pub. No.: WO2007/007708
PCT Pub. Date: Jan. 18, 2007

(65) Prior Publication Data
US 2010/0136456 A1 Jun. 3, 2010

(30) Foreign Application Priority Data
Jul. 13, 2005 (JP) .................................. 2005-204871

(51) Int. Cl.
*H01M 8/04* (2006.01)
*H01M 8/10* (2006.01)

(52) U.S. Cl. .................... 429/469; 429/460; 429/508

(58) Field of Classification Search ................... 429/469, 429/460, 508
See application file for complete search history.

(56) References Cited

U.S. PATENT DOCUMENTS

| 6,866,959 | B2 * | 3/2005 | Kikuchi et al. | ............... 429/434 |
| 7,070,876 | B2 * | 7/2006 | Artibise et al. | ............... 429/483 |

FOREIGN PATENT DOCUMENTS

| JP | 11-233128 | 8/1999 |
| JP | 2002-141082 | 5/2002 |
| JP | 2002-329512 | 11/2002 |
| JP | 2004-055428 | 2/2004 |
| JP | 2004-119121 | 4/2004 |
| JP | 2004-207071 | 7/2004 |
| JP | 2004-265824 | 9/2004 |
| JP | 2004-335306 | 11/2004 |
| JP | 2005-158424 | 6/2005 |
| JP | 2005-174875 | 6/2005 |

* cited by examiner

*Primary Examiner* — John S Maples
(74) *Attorney, Agent, or Firm* — McDermott Will & Emery LLP

(57) ABSTRACT

To provide a polymer electrolyte fuel cell in which a reaction gas can be utilized efficiently for an electrode reaction even when a gap is formed between an anode-side sealing member and the end face of an anode and between a cathode-side sealing member and the end face of a cathode, and sufficient power generation performance can be ensured with a simple constitution. At least one of the anode-side sealing member and the cathode-side sealing member of the fuel cell includes an annular body, and at least one deformable protruding portion provided on the inner surface of the annular body.

15 Claims, 5 Drawing Sheets

F I G. 1
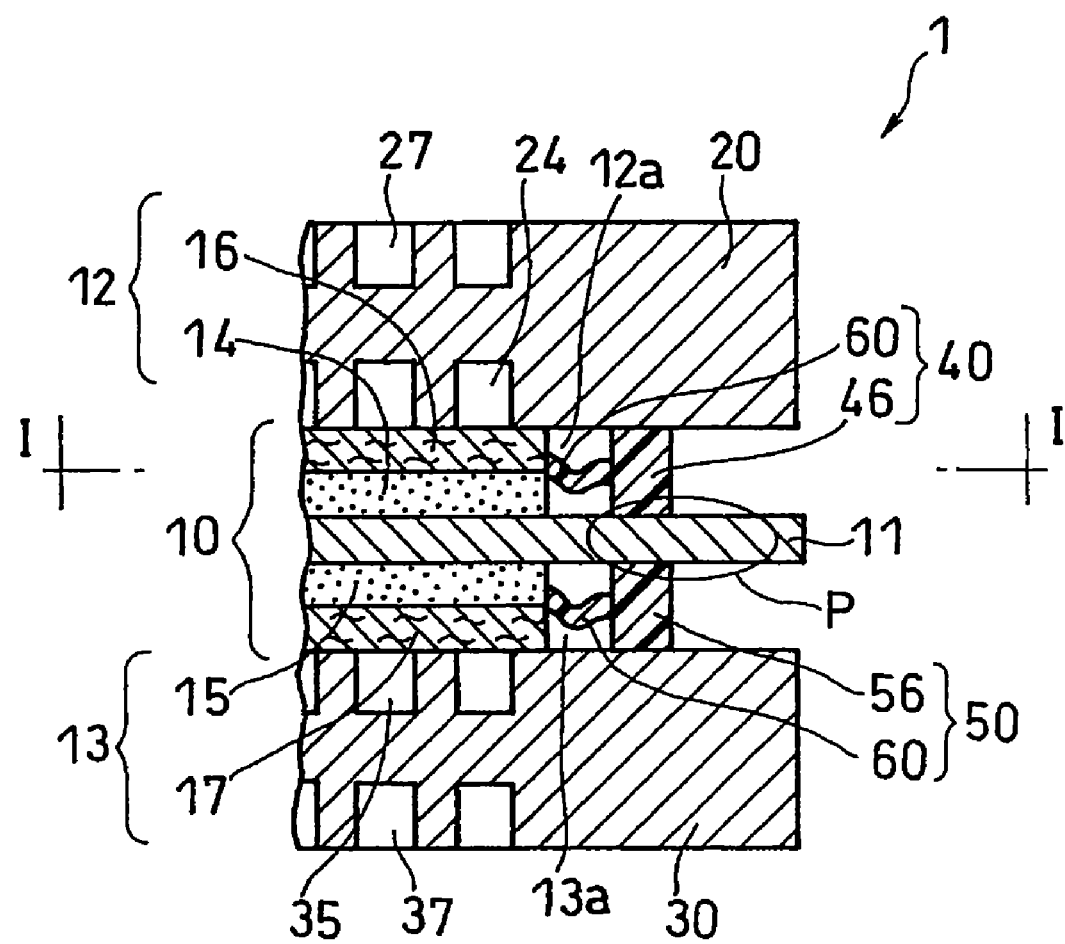

POLYMER ELECTROLYTE FUEL CELL AND FUEL CELL SEALING MEMBER FOR THE SAME

RELATED APPLICATIONS

This application is the U.S. National Phase under 35 U.S.C. §371 of International Application No. PCT/JP2006/313676, filed on Jul. 10, 2006 which in turn claims the benefit of Japanese Application No. 2005-204871, filed on Jul. 13, 2005, the disclosures of which Applications are incorporated by reference herein.

TECHNICAL FIELD

The present invention relates to a fuel cell including a polymer electrolyte for use as a portable power source, a power source for portable devices, a power source for electric vehicles, a cogeneration system for home use, and the like.

BACKGROUND ART

A polymer electrolyte fuel cell is a battery that generates electricity and heat simultaneously by allowing a fuel gas such as hydrogen and an oxidant gas such as air, which are reaction gases, to electrochemically react respectively with an anode and a cathode, which are gas diffusion electrodes. FIG. 8 shows a cross sectional view of a relevant part of a typical type of a basic component (unit cell) of such a polymer electrolyte fuel cell. As shown in FIG. 8, a fuel cell 100 includes at least one unit cell composed mainly of a membrane electrode assembly (MEA) 110, and a pair of separator plates sandwiching the membrane electrode assembly 110, specifically, an anode-side separator 120 and a cathode-side separator 130.

The membrane electrode assembly 110 has a constitution in which a polymer electrolyte membrane 111 that selectively transports cations (hydrogen ions) is disposed between the anode 112 and the cathode 113. Further, the anode 112 includes at least a catalyst layer 114 disposed in tight contact with the polymer electrolyte membrane 111 and a gas diffusion layer 116 disposed between the catalyst layer 114 and the anode-side separator 120. The cathode 113 includes at least a catalyst layer 115 disposed in tight contact with the polymer electrolyte membrane 111 and a gas diffusion layer 117 disposed between the catalyst layer 115 and the cathode-side separator 130.

The catalyst layers 114 and 115 are layers composed mainly of a conductive carbon powder carrying an electrode catalyst (e.g., a platinum group metal). The gas diffusion layers 116 and 117 are layers having gas permeability and conductivity. The gas diffusion layers 116 and 117 are obtained by, for example, forming a conductive water repellent layer composed of a conductive carbon powder and a fluorocarbon resin on a conductive porous substrate made of carbon.

As shown in FIG. 8, in the MEA 110, for the purpose of disposing sealing members (gaskets) 140 and 150 for preventing gas leakage, the polymer electrolyte membrane 111 is configured such that the main surface of the polymer electrolyte membrane 111 is larger in size than the main surfaces of the anode 112 and the cathode 113 and that the entire outer periphery of the polymer electrolyte membrane 111 extends outward from the outer peripheries of the anode 112 and the cathode 113. As used herein, the outer periphery of the polymer electrolyte membrane 111 that extends outward from the outer peripheries of the anode 112 and the cathode 113 is also referred to as "extended portion" (the portion indicated by "P" in FIG. 8).

The anode-side separator 120 and the cathode-side separator 130 have conductivity and serve to mechanically fix the MEA 110 and to electrically connect adjacent MEAs 110 in series when a plurality of MEAs 110 are stacked. In the anode-side separator 120 and the cathode-side separator 130, a gas channel 124, 135 for supplying a reaction gas to the anode 120 or the cathode 130 and discharging a gas containing a product produced by an electrode reaction and an unreacted reactant to the outside of the MEA 110 is formed in one surface (i.e., the main surfaces of the anode-side separator 120 and the cathode-side separator 130 to be in contact with the anode 112 and the cathode 113, respectively).

Further, on the other surfaces of the anode-side separator 120 and the cathode-side separator 130, a cooling fluid channel 127, 137 for introducing a cooling fluid (cooling water, etc.) to adjust the cell temperature to be almost constant is formed. With the constitution that allows a cooling fluid to circulate between the fuel cell and a heat exchanger disposed outside the fuel cell, it is possible to utilize a thermal energy generated by the reaction in the form of hot water or the like.

To simplify the production process, the gas channels 124 and 135 are usually provided by a method in which a groove is formed on the main surfaces of the anode-side separator 120 and the cathode-side separator 130 to be in contact with the anode 112 and the cathode 113. The cooling fluid channels 127 and 137 are usually provided by a method in which a groove is formed on the main surfaces of the anode-side separator 120 and the cathode-side separator 130 facing the outside.

In a so-called stack type fuel cell (fuel cell stack) obtained by stacking a plurality of MEAs 110 with anode-side separators 120 and cathode-side separators 130 interposed between the plurality of MEAs 110 and electrically connecting them in series, a manifold is provided for branching a reaction gas supplied to the fuel cell to supply the gas to each MEA 110 (a manifold formed by combining manifold apertures for supplying a reaction gas and manifold apertures for discharging a reaction gas formed in the anode-side separators 120 and the cathode-side separators 130 which are successively stacked (not shown)).

Another manifold is provided for branching a cooling fluid supplied to the fuel cell to supply the fluid to each MEA 110 (a manifold formed by combining manifold apertures for supplying a cooling fluid and manifold apertures for discharging a cooling fluid formed in the anode-side separators 120 and the cathode-side separators 130 which are successively stacked (not shown)). The manifolds formed inside the fuel cell as described above are called "internal manifolds", and the "internal manifold type" fuel cells are commonly employed.

In the fuel cell 100, in order to prevent gas leakage of reaction gas (leakage of fuel gas to the cathode 112 side, leakage of oxidant gas to the anode 113 side, leakage of reaction gases to the outside of the MEA 110, and the like), between the anode-side separator 120 and the cathode-side separator 130 facing each other, a pair of facing sealing members having a gas sealing function, specifically, an anode-side sealing member 140 and a cathode-side sealing member 150, are disposed in the outer periphery of the MEA 110 (the outer periphery of the polymer electrolyte membrane 111 that is outside the anode 112 and the cathode 113).

In order to provide gas sealing while the anode-side sealing member 140 and the cathode-side sealing member 150 are brought into contact with the anode-side separator 120 and the anode 112, and with the cathode-side separator 130 and the cathode 113, respectively, a high dimensional accuracy, a sufficient elasticity and margin for clamping are required. For this reason, for example, O-rings made of resin and rubber, sheet-shaped sealing members, composite sheets composed of an elastic resin and a rigid resin, and the like are used. From the view point of handling of MEA 110, usually, a sealing member made of a composite material having a certain rigidity is combined with the MEA 110 for use.

Recently, as disclosed in Patent Documents 1 and 2, attempts are made to reduce the load of sealing member necessary for sealing so as to reduce the clamping load of fuel cell stack and to achieve weight reduction, simplification and low cost of structural members, and in addition to sealing members having an O-ring shape, sealing members whose cross section is triangular, semicircular and the like are also proposed. Further attempts are also made to provide a sealing member having a certain cross sectional area such as an O-ring to a separator plate.

By disposing the anode-side sealing member 140 and the cathode-side sealing member 150 such that they sandwich the entire extended portion of the polymer electrolyte membrane 111 described above, one enclosed space that encases the anode 112 is formed by the anode-side separator 120, the polymer electrolyte membrane 111 and the anode-side sealing member 140, and another enclosed space that encases the cathode 113 is formed by the cathode-side separator 130, the polymer electrolyte membrane 111 and the cathode-side sealing member 150.

These enclosed spaces serve to prevent gas leakage of reaction gases supplied to the anode 112 and the cathode 113. The combination of the anode-side sealing member 140 and the cathode-side sealing member 150 with the membrane electrode assembly 110 is sometimes called "membrane electrode sealing assembly (MESA)".

When disposing the anode-side sealing member 140 and the cathode-side sealing member 150 in the above-described position, machining tolerances of components and assembly tolerances always occur. For this reason, it is extremely difficult to bring the anode-side sealing member 140 and the cathode-side sealing member 150 into sufficient contact with the end faces of the anode 112 and the cathode 113, respectively. Accordingly, as shown in FIG. 8, when disposing the anode-side sealing member 140 and the cathode-side sealing member 150 in the above-described position, a gap is likely to be formed between the anode-side sealing member 140 and the anode 112 and between the cathode-side sealing member 150 and the cathode 113 (i.e., an anode-side gap 112a and a cathode-side gap 113a).

If the anode-side gap 112a and the cathode-side gap 113a as described above are formed, reaction gases may leak into the anode-side gap 112a and the cathode-side gap 113a. Also, there is a problem that part of reaction gases flows through the anode-side gap 112a and the cathode-side gap 113a to the outside of the MEA 110 without flowing through the anode 112 and the cathode 113, which makes it extremely difficult to maintain efficient power generation performance.

If the anode-side gap 112a and the cathode-side gap 113a are small, a part of the anode 112 and the cathode 113 gets into the anode-side sealing member 140 and the cathode-side sealing member 150, causing insufficient sealing, or the anode-side sealing member 140 and the cathode-side sealing member 150 contact the anode 112 and the cathode 113, deteriorating the cell performance, or an excessive surface pressure acts on the anode 112 and the cathode 113, causing damage to the polymer electrolyte membrane 111 and durability deterioration. Because of this, the anode-side gap 112a and the cathode-side gap 113a having a certain size must be formed between the anode-side sealing member 140 and the MEA 110 and between the cathode-side sealing member 150 and the MEA 110, respectively.

In contrast to the above, for example, Patent Document 1 proposes to use a tube-shaped sealant for the purpose of enlarging the anode-side gap 112a and the cathode-side gap 113a in the thickness direction of the MEA 110 while reducing the clamping force and of simplifying the processing operation while effectively ensuring desired cell performance without gas leakage.

Patent Document 1: Japanese Laid-Open Patent Publication No. Hei 11-233128

Patent Document 2: Japanese Laid-Open Patent Publication No. 2002-141082

DISCLOSURE OF THE INVENTION

Problem to be Solved by the Invention

However, even with the technique of Patent Document 1, it is difficult to effectively prevent a fuel gas and an oxidant gas from flowing the anode-side gap between the anode-side sealing member and the anode and the cathode-side gap between the cathode-side sealing member and the cathode as bypasses, and there still remains room for improvement to be made.

The present invention has been accomplished in view of the above problem. It is an object of the present invention to provide a polymer electrolyte fuel cell in which a reaction gas can be utilized efficiently for an electrode reaction even when the gap as described above is formed between the anode-side sealing member and the end face of the anode and between the cathode-side sealing member and the end face of the cathode, and sufficient power generation performance can be ensured with a simple constitution. Further, another object of the present invention is to provide a sealing member with which a polymer electrolyte fuel cell as described above can be achieved in an easy and ensured manner.

Means for Solving the Problem

In order to achieve above objects, the present invention provides a polymer electrolyte fuel cell comprising: a membrane electrode assembly including a polymer electrolyte membrane having a hydrogen ion conductivity, and an anode and a cathode that sandwich the polymer electrolyte membrane; an anode-side separator plate having a gas channel for supplying a fuel gas to the anode, and a cathode-side separator having a gas channel for supplying an oxidant gas to the cathode; an anode-side sealing member for maintaining air-tightness between the anode and the anode-side separator plate disposed between the outer periphery of the membrane electrode assembly and the side face of the anode-side separator plate facing the membrane electrode assembly; and a cathode-side sealing member for maintaining air-tightness between the cathode and the cathode-side separator plate disposed between the outer periphery of the membrane electrode assembly and the side face of the cathode-side separator plate facing the membrane electrode assembly, wherein at least one of the anode-side sealing member and the cathode-side sealing member comprises: an annular body disposed along the outer periphery of the membrane electrode assembly; and at least one deformable protruding portion provided on the inner surface of the annular body.

With this constitution of the present invention, in the surface of the anode-side separator facing the membrane electrode assembly and the surface of the cathode-side separator facing the membrane electrode assembly, it is possible to maintain air-tightness between the anode and the anode-side separator plate as well as between the cathode and the cathode-side separator plate, and at the same time, even when a gap is formed between the sealing member and the end face of the anode or cathode (an anode-side gap or a cathode-side gap), the protruding portion can prevent a gas flow that flows in the gap.

More specifically, even if a fuel gas or oxidant gas flows in the anode-side gap or cathode-side gap, because the protruding portion is deformable, the protruding portion deforms upon receiving the gas flow and serves to prevent the gas flow. Accordingly, it is possible to achieve a polymer electrolyte fuel cell in which a reaction gas can be utilized efficiently for an electrode reaction and sufficient power generation performance can be ensured with a simple constitution, in an easy and ensured manner.

Further, according to the present invention, the protruding portion has the effect of positioning when the membrane electrode assembly and the sealing member are combined, and therefore it is possible to improve the yield during mass production of the polymer electrolyte fuel cell of the present invention. Furthermore, a significant cost reduction can be achieved.

The present invention further provides a sealing member for a fuel cell comprising: an annular body; and at least one deformable protruding portion provided on the inner surface of the annular body.

With this constitution of the present invention, when the sealing member for a fuel cell is used in a polymer electrolyte fuel cell, in the surface of the anode-side separator facing the membrane electrode assembly and the surface of the cathode-side separator facing the membrane electrode assembly, it is possible to maintain air-tightness between the anode and the anode-side separator plate as well as between the cathode and the cathode-side separator plate, and at the same time, even when a gap is formed between the sealing member and the end face of the anode or cathode (an anode-side gap or a cathode-side gap), the protruding portion can prevent a gas flow that flows in the gap.

More specifically, even if a fuel gas flows in the anode-side gap, or an oxidant gas flows in the cathode-side gap, because the protruding portion is deformable, the protruding portion deforms upon receiving the gas flow and serves to prevent the gas flow. Accordingly, it is possible to achieve a polymer electrolyte fuel cell in which a reaction gas can be utilized efficiently for an electrode reaction and sufficient power generation performance can be ensured with a simple constitution, in an easy and ensured manner.

Further, with the use of the sealing member for a fuel cell of the present invention, because the protruding portion has the effect of positioning when the membrane electrode assembly and the sealing member are combined, it is possible to improve the yield during mass production of the polymer electrolyte fuel cell. Furthermore, a significant cost reduction can be achieved.

Effect of the Invention

According to the present invention, it is possible to provide a polymer electrolyte fuel cell in which a reaction gas can be utilized efficiently for an electrode reaction even when a gap is formed between the anode-side sealing member and the end face of the anode and between the cathode-side sealing member and the end face of the cathode, and sufficient power generation performance can be ensured with a simple constitution.

Further, according to the present invention, it is possible to provide a sealing member with which a polymer electrolyte fuel cell in which sufficient power generation can be ensured with a simple constitution as described above can be achieved in an easy and ensured manner.

BRIEF DESCRIPTION OF THE DRAWINGS

FIG. 1 is a cross sectional view of a relevant part of a basic component (unit cell) of a polymer electrolyte fuel cell of the present invention.

BEST MODE FOR CARRYING OUT THE INVENTION

Figure 2:
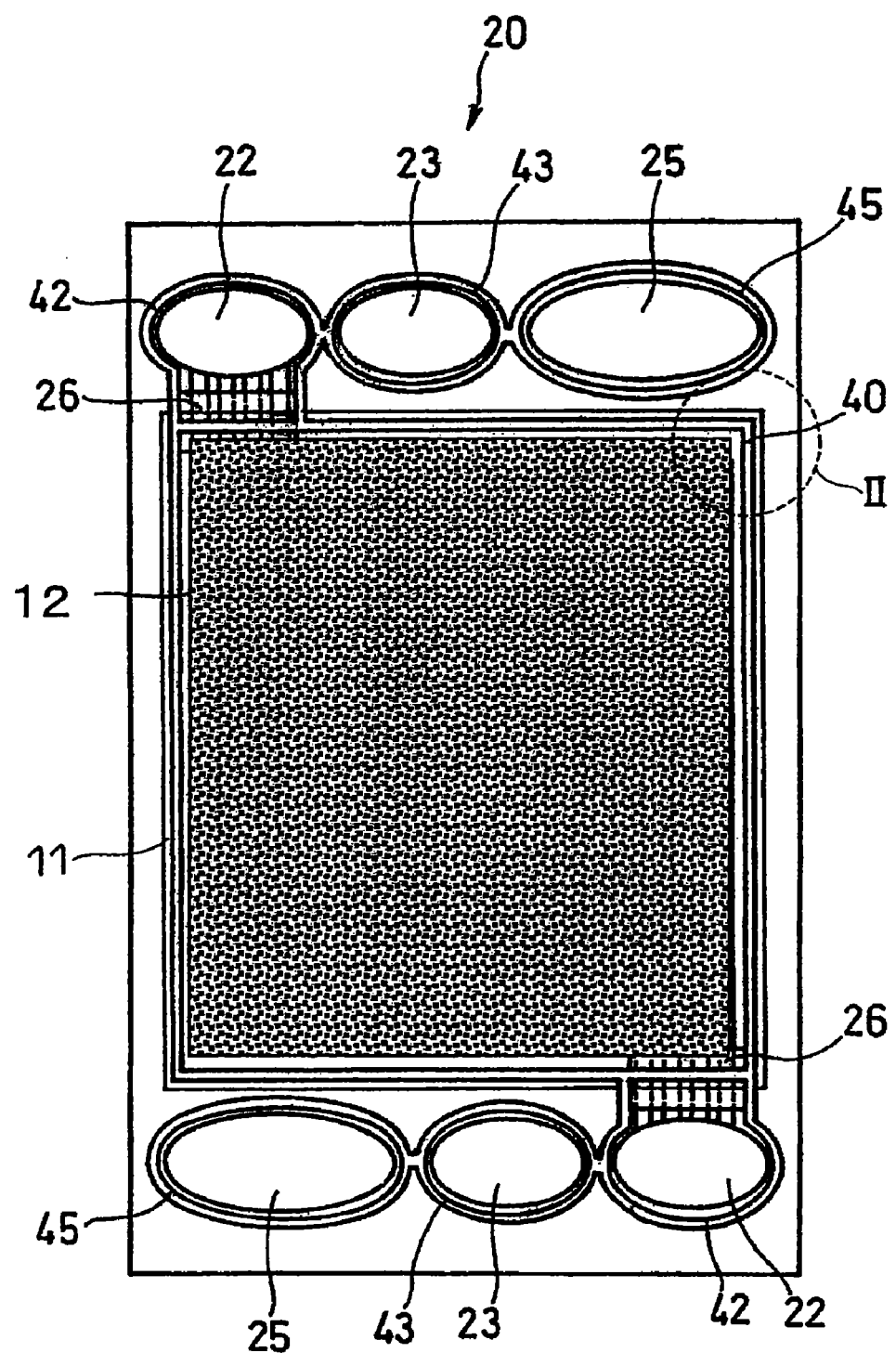
FIG. 2 is a sectional view taken along the line I-I of FIG. 1.

Hereinafter, preferred embodiments of the present invention will be described with reference to the accompanying drawings. In the description given below, the same reference numbers are given to the same or corresponding portions, and thus redundant description may sometimes be omitted.

First Embodiment

FIG. 1 shows a cross sectional view of a relevant part of a basic component (unit cell) of a polymer electrolyte fuel cell of the present invention. As shown in FIG. 1, a fuel cell 1 includes at least one unit cell composed mainly of a membrane electrode assembly (MEA) 10, and a pair of separator plates sandwiching the membrane electrode assembly 10, specifically, an anode-side separator 20 and a cathode-side separator 30.

The membrane electrode assembly 10 has a constitution in which a polymer electrolyte membrane 11 that selectively transports cations (hydrogen ions) is disposed between the anode 12 and the cathode 13. Further, the anode 12 includes at least a catalyst layer 14 disposed in tight contact with the polymer electrolyte membrane 11 and a gas diffusion layer 16 disposed between the catalyst layer 14 and the anode-side separator 20. The cathode 13 includes at least a catalyst layer 15 disposed in tight contact with the polymer electrolyte membrane 11 and a gas diffusion layer 17 disposed between the catalyst layer 15 and the cathode-side separator 30.

The catalyst layers 14 and 15 are layers composed mainly of a conductive carbon powder carrying an electrode catalyst (e.g., a platinum group metal). The gas diffusion layers 16 and 17 are layers having gas permeability and conductivity. The gas diffusion layers 16 and 17 are obtained by, for example, forming a conductive water repellent layer composed of a conductive carbon powder and a fluorocarbon resin on a conductive porous substrate made of carbon.

As shown in FIG. 1, in the MEA 10, for the purpose of disposing sealing members (gaskets) 40 and 50 for preventing gas leakage, the polymer electrolyte membrane 11 is configured such that the main surface of the polymer electrolyte membrane 11 is larger in size than the main surfaces of the anode 12 and the cathode 13 and that the entire outer periphery of the polymer electrolyte membrane 11 extends outward from the outer peripheries of the anode 12 and the cathode 13.

The anode-side separator 20 and the cathode-side separator 30 have conductivity and serve to mechanically fix the MEA 10 and to electrically connect adjacent MEAs 10 in series when a plurality of MEAs 10 are stacked. In the anode-side separator 20 and the cathode-side separator 30, a gas channel 24, 35 for supplying a reaction gas to the anode 20 or the cathode 30 and discharging a gas containing a product produced by an electrode reaction and an unreacted reactant to the outside of the MEA 10 is formed on one surface (i.e., the main surfaces of the anode-side separator 20 and the cathode-side separator 30 to be in contact with the anode 12 and the cathode 13, respectively).

Further, cooling fluid channels 27 and 37 for introducing a cooling fluid (cooling water, etc.) to adjust the cell temperature to be almost constant are formed on the other surfaces of the anode-side separator 20 and the cathode-side separator 30, respectively. With the constitution that allows a cooling fluid to circulate between the fuel cell and a heat exchanger disposed outside the fuel cell, it is possible to utilize a thermal energy generated by the reaction in the form of hot water or the like.

To simplify the production process, the gas channels 24 and 35 are usually provided by a method in which a groove is formed on the main surfaces of the anode-side separator 20 and the cathode-side separator 30 to be in contact with the anode 12 and the cathode 13, respectively. The cooling fluid channels 27 and 37 are usually provided by a method in which a groove is formed on the main surfaces of the anode-side separator 20 and the cathode-side separator 30 facing the outside.

In a so-called stack type fuel cell (fuel cell stack) obtained by stacking a plurality of MEAs 10 with anode-side separators 20 and cathode-side separators 30 interposed between the plurality of MEAs 10 and electrically connecting them in series, a manifold is provided for branching a reaction gas supplied to the fuel cell to supply the gas to each MEA 10 (a manifold formed by combining manifold apertures for supplying a reaction gas and manifold apertures for discharging a reaction gas formed in the anode-side separators 20 and the cathode-side separators 30 which are successively stacked (not shown)).

Another manifold is provided for branching a cooling fluid supplied to the fuel cell to supply the fluid to each MEA 10 (a manifold formed by combining manifold apertures for supplying a cooling fluid and manifold apertures for discharging a cooling fluid formed in the anode-side separators 20 and the cathode-side separators 30 which are successively stacked (not shown)). The manifolds formed inside the fuel cell as described above are called "internal manifolds", and the "internal manifold type" fuel cells are commonly employed.

FIG. 2 is a sectional view taken along the line I-I of FIG. 1. An anode-side separator plate 20 shown in FIG. 2 comprises, for example, a graphite plate or a carbon plate obtained by molding a mixture of a carbon powder and a binder, and has a pair of fuel gas manifold apertures 22, a pair of oxidant gas manifold apertures 25, and a pair of cooling water manifold apertures 23. The anode-side separator plate 20 further has a fuel gas channel 24 connecting the pair of fuel gas manifold apertures 22 on the surface thereof facing the anode 12, and a cooling water channel 27 connecting the pair of cooling water manifold apertures 23 on the other surface thereof.

In FIG. 2, the gas channel 24 comprises four grooves arranged in parallel. In a portion of the gas channel 24 connecting with a fuel gas manifold aperture 22, a cover plate (partition plate) 26 is provided to prevent the anode-side sealing member 40 from sagging the groove. This portion of the gas channel 24 has a tunnel like shape. The cover plate is described in, for example, Japanese Laid-Open Patent Publication No. 2000-133289, the content of which is incorporated herein by reference.

Although not shown, similarly to the anode-side separator plate 20, the cathode-side separator plate 30 has a pair of fuel gas manifold apertures, a pair of oxidant gas manifold apertures, and a pair of cooling water manifold apertures, and further has an oxidant gas channel 35 connecting the pair of oxidant gas manifold apertures on the surface thereof facing the cathode, and a cooling water channel 37 connecting the pair of cooling water manifold apertures on the other surface thereof.

In the fuel cell 1, in order to prevent gas leakage of reaction gas (leakage of fuel gas to the cathode 12, leakage of oxidant gas to the anode 13, leakage of reaction gases to the outside of the MEA 10, and the like), between the anode-side separator 20 and the cathode-side separator 30 facing each other, a pair of facing sealing members having a gas sealing function, specifically, an anode-side sealing member 40 and a cathode-side sealing member 50, are disposed in the outer periphery of the MEA 10 (the outer periphery of the polymer electrolyte membrane 11 that is outside the anode 12 and the cathode 13).

As just described, the anode-side sealing member 40 and the cathode-side sealing member 50 are disposed such that they sandwich the entire extended portion of the polymer electrolyte membrane 11 described previously, and then the anode-side separator 20, the anode-side sealing member 40, the MEA 10, the cathode-side sealing member 50 and the cathode-side separator 30 are clamped with a predetermined clamping pressure, whereby a unit cell configured as shown in FIG. 1 is formed.

In the unit cell, one enclosed space that encases the anode 12 is formed by the anode-side separator 20, the polymer electrolyte membrane 11 and the anode-side sealing member 40, and another enclosed space that encases the cathode 13 is formed by the cathode-side separator 30, the polymer electrolyte membrane 11 and the cathode-side sealing member 50.

These enclosed spaces serve to prevent gas leakage of reaction gases supplied to the anode 12 and the cathode 13. However, as described above, when disposing the anode-side sealing member 40 and the cathode-side sealing member 50 in the above-described position, machining tolerances of components and assembly tolerances always occur. For this reason, it is extremely difficult to bring the anode-side sealing member 40 and the cathode-side sealing member 50 into sufficient contact with the end faces of the anode 12 and the cathode 13, respectively. Accordingly, as shown in FIG. 1, when disposing the anode-side sealing member 40 and the cathode-side sealing member 50 in the above-described position, a gap is likely to be formed between the anode-side sealing member 40 and the anode 12 and between the cathode-side sealing member 50 and the cathode 13 (i.e., an anode-side gap 12a and a cathode-side gap 13a).

In this embodiment, in order to solve the problem that the reaction gases flow through the anode-side gap 12a and the cathode-side gap 13a as bypasses, lowering the utilization rates of the reaction gases, and making it extremely difficult to maintain efficient power generation performance, the anode-side sealing member 40 and the cathode-side sealing member 50 each comprises an annular body disposed along the outer periphery of the membrane electrode assembly 10 and at least one deformable protruding portion provided on the inner surface of the annular body.

Figure 3:
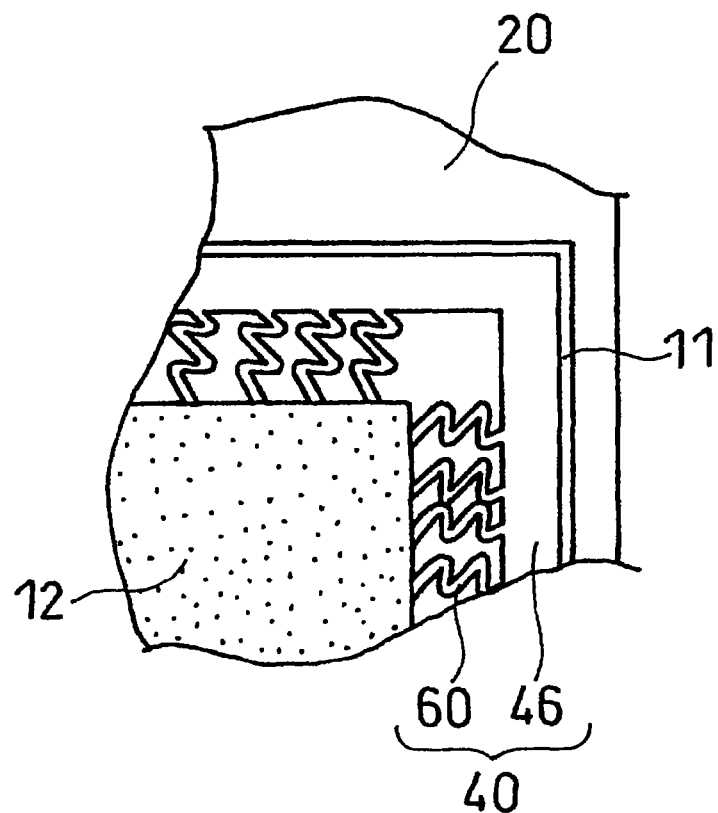
FIG. 3 is a diagram to illustrate the structure of an anode-side sealing member 40 of a fuel cell according to a first embodiment.

FIG. 3 is an enlarged view of the portion indicated by "II" of FIG. 2, that is, a diagram to illustrate the structure of the portion II of the anode-side sealing member 40. As shown in FIGS. 1 and 3, the anode-side sealing member 40 comprises an annular body 46 disposed such that the annular body 46 surrounds the anode 12, and a plurality of hair-shaped protruding portions 60 capable of being deformed by having flexibility which are provided on the annular body 46 such that the length direction of the protruding portions 60 and the surface direction of the inner surface of the annular body 46 intersect substantially orthogonally with each other. The protruding portions 60 are in contact with the side face of the anode 12.

The protruding portions 60 are deformed upon receiving a flow of fuel gas when the fuel gas flows in the anode-side gap 12a as a bypass, whereby the protruding portions 60 exhibit the effect of suppressing the flow. Further, because the protruding portions 60 are in contact with the entire side face of the anode 12, the protruding portions 60 also have the effect of allowing the anode 12 to be positioned within the anode-side sealing member 40 in an easy and ensured manner. Although not shown, the cathode-side sealing members 50 also have a structure and function similar to those of the anode-side sealing members 40.

The main requirements for the protruding portions 60 of this embodiment include: (1) being capable of deforming during assembly of MEA 10 or fuel cell 1 so that the protruding portions 60 can be fitted between the annular body 46 and the anode 12 or the cathode 13, specifically, in the anode-side gap 12a or the cathode-side gap 13a; (2) having high chemical durability; and the like.

Accordingly, examples of the material for the protruding portions 60 include fluorocarbon rubber, polyisoprene, butyl rubber, ethylene propylene rubber, silicone rubber, nitrile rubber, thermoplastic elastomer, liquid crystal polymer, polyimide resin, polyether ether ketone resin, polyether imide resin, polyphenylene sulfide resin, terephthalamide resin, polyethersulfone resin, polysulfone resin, syndiotactic polystyrene resin, polymethylpentene resin, modified polyphenylene ether resin, polyacetal resin, polypropylene resin, fluorocarbon resin, polyethylene terephthalate resin, and composite materials including a plurality of the above.

Particularly, with the use of a material having elasticity, the positioning effect of the protruding portions 60 during assembly of MEA 10 or fuel cell 1 can be improved.

As the material for the annular bodies 46 and 56 of the anode-side sealing member 40 and the cathode-side sealing member 50, materials used for conventional sealing members and gaskets can be used. However, it is preferable to use the same material as that of the protrusions 60 and to form (mold) the protruding portions 60 and the annular body 46, 56 into a one-piece structure. Thereby, it is possible to reduce the number of steps for producing the anode-side sealing member 40 and the cathode-side sealing member 50 as well as to improve durability, achieving a significant cost reduction.

As described above, according to this embodiment, it is possible to provide a polymer electrolyte fuel cell in which reaction gases can be utilized efficiently for electrode reactions even when a gap is formed between the anode-side sealing member 40 and end face of the anode 12 and between the cathode-side sealing member 50 and the end face of the cathode 13, and sufficient power generation performance can be ensured with a simple constitution.

Further, with the simple constitution as described above, it is possible to provide an anode-side sealing member 40 and a cathode-side sealing member 50 with which a polymer electrolyte fuel cell capable of ensuring sufficient power generation can be achieved in an easy and ensured manner.

Second Embodiment

A polymer electrolyte fuel cell according to a second embodiment of the present invention will now be described. In this fuel cell according to the second embodiment (not shown), the anode-side sealing member and the cathode-side sealing member are configured differently from those of the fuel cell 1 of the first embodiment shown in FIG. 1, so the fuel cell according to the second embodiment has the same constitution as that of the fuel cell 1 according to the first embodiment except for the anode-side sealing member and the cathode-side sealing member.

Figure 4:
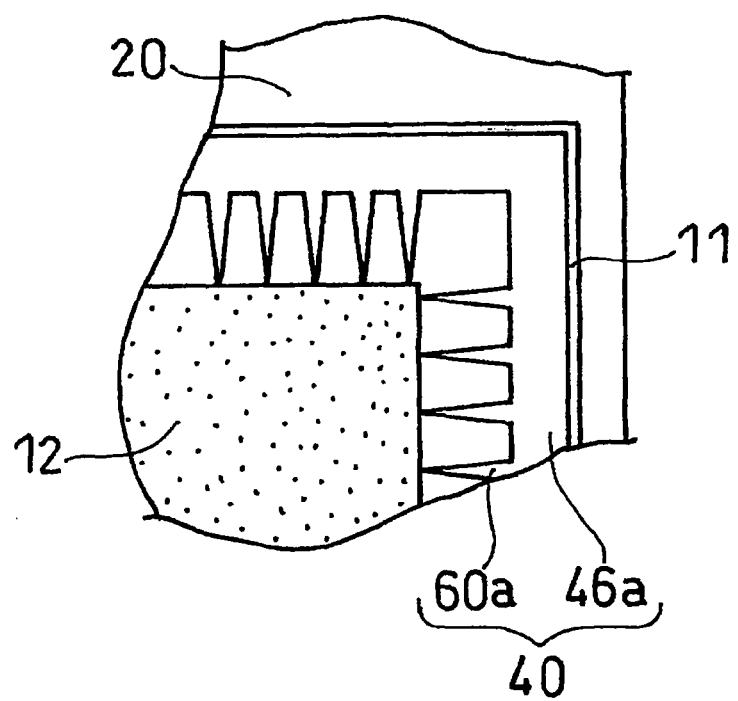
FIG. 4 is a diagram to illustrate the structure of an anode-side sealing member 40 of a fuel cell according to a second embodiment.

Hereinafter, the anode-side sealing member included in the fuel cell of the second embodiment will be described. FIG. 4 is an enlarged view of a relevant part of the portion indicated by "II" of FIG. 2, that is, a diagram to illustrate the structure of the anode-side sealing member 40 of the fuel cell according to the second embodiment.

As shown in FIG. 4, the anode-side sealing member 40 of this embodiment comprises an annular body 46a disposed such that the annular body 46a surrounds the anode 12, and a plurality of needle-shaped protruding portions 60a capable of being deformed by having flexibility which are provided on the annular body 46a such that the length direction of the protruding portions 60a and the surface direction of the inner surface of the body 46a intersect substantially orthogonally with each other. The protruding portions 60a are in contact with the side face of the anode 12.

The protruding portions 60a are deformed upon receiving a flow of fuel gas when the fuel gas flows in the anode-side gap 12a as a bypass, whereby the protruding portions 60a exhibit the effect of suppressing the flow. Further, because the protruding portions 60a are in contact with the entire side face of the anode 12, the protruding portions 60a also have the effect of allowing the anode 12 to be positioned within the anode-side sealing member 40 in an easy and ensured manner. Although not shown, the cathode-side sealing member 50 also has a structure and function similar to those of the anode-side sealing member 40.

As described above, according to this embodiment, it is possible to provide a polymer electrolyte fuel cell in which reaction gases can be utilized efficiently for electrode reactions even when a gap is formed between the anode-side sealing member 40 and the end face of the anode 12 and between the cathode-side sealing member 50 and the end face of the cathode 13, and sufficient power generation performance can be ensured with a simple constitution.

Further, with the simple constitution as described above, it is possible to provide an anode-side sealing member 40 and a cathode-side sealing member 50 with which a polymer electrolyte fuel cell capable of ensuring sufficient power generation can be achieved in an easy and ensured manner.

Third Embodiment

A polymer electrolyte fuel cell according to a third embodiment of the present invention will now be described. In this fuel cell according to the third embodiment (not shown), the anode-side sealing member and the cathode-side sealing member are configured differently from those of the fuel cell 1 of the first embodiment shown in FIG. 1, so the fuel cell according to the third embodiment has the same constitution as that of the fuel cell 1 according to the first embodiment except for the anode-side sealing member and the cathode-side sealing member.

Figure 5:
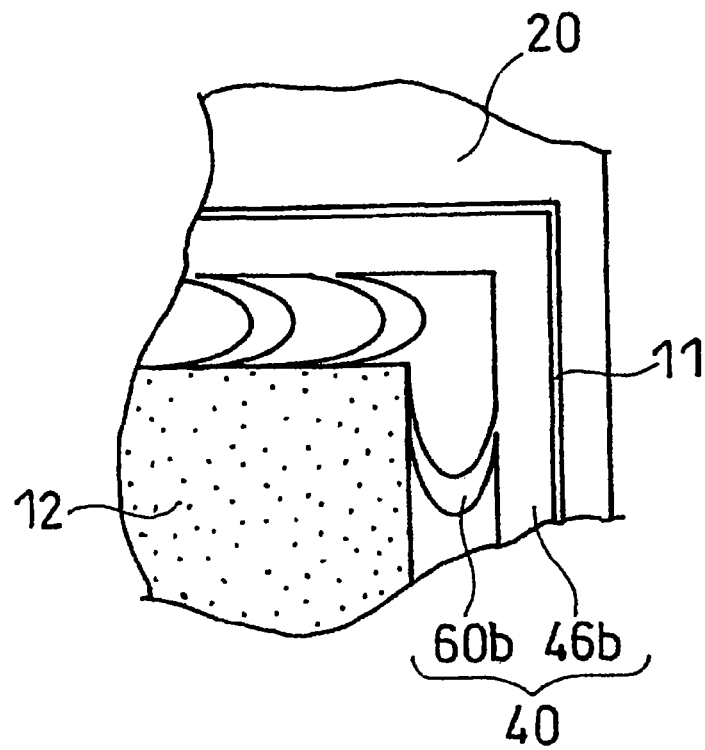
FIG. 5 is a diagram to illustrate the structure of an anode-side sealing member 40 of a fuel cell according to a third embodiment.

Hereinafter, the anode-side sealing member included in the fuel cell of the third embodiment will be described. FIG. 5 is an enlarged view of a relevant part of the portion indicated by "II" of FIG. 2, that is, a diagram to illustrate the structure of the anode-side sealing member 40 of the fuel cell according to the third embodiment.

As shown in FIG. 5, the anode-side sealing member 40 of this embodiment comprises an annular body 46b disposed such that the annular body 46b surrounds the anode 12, and a plurality of crescent-shaped protruding portions 60b capable of being deformed by having flexibility which are provided on the inner surface of the annular body 46b such that the protruding portions 60b can receive a gas flow flowing substantially parallel to the surface direction of the inner surface of the annular body 46b. The other ends of the protruding portions 60b are in contact with the side face of the anode 12.

The crescent-shaped protruding portions 60b can have a thickness equal to or less than that of the annular body 46b.

The protrusions 60b are deformed upon receiving a flow of fuel gas when the fuel gas flows in the anode-side gap 12a as a bypass, so the protrusions 60b particularly have excellent effect of suppressing the flow. Further, because the protruding portions 60b are in contact with the entire side face of the anode 12, the protruding portions 60b also have the effect of allowing the anode 12 to be positioned within the anode-side sealing member 40 in an easy and ensured manner. Although not shown, the cathode-side sealing member 50 also has a structure and function similar to those of the anode-side sealing member 40.

As described above, according to this embodiment, it is possible to provide a polymer electrolyte fuel cell in which reaction gases can be utilized efficiently for electrode reactions even when a gap is formed between the anode-side sealing member 40 and end face of the anode 12 and between the cathode-side sealing member 50 and the end face of the cathode 13, and sufficient power generation performance can be ensured with a simple constitution.

Further, with the simple constitution as described above, it is possible to provide an anode-side sealing member 40 and a cathode-side sealing member 50 with which a polymer electrolyte fuel cell capable of ensuring sufficient power generation can be achieved in an easy and ensured manner.

Fourth Embodiment

A polymer electrolyte fuel cell according to a fourth embodiment of the present invention will now be described. In this fuel cell according to the fourth embodiment (not shown), the anode-side sealing member and the cathode-side sealing member are configured differently from those of the fuel cell 1 of the first embodiment shown in FIG. 1, so the fuel cell according to the fourth embodiment has the same constitution as that of the fuel cell 1 according to the first embodiment except for the anode-side sealing member and the cathode-side sealing member.

Figure 6:
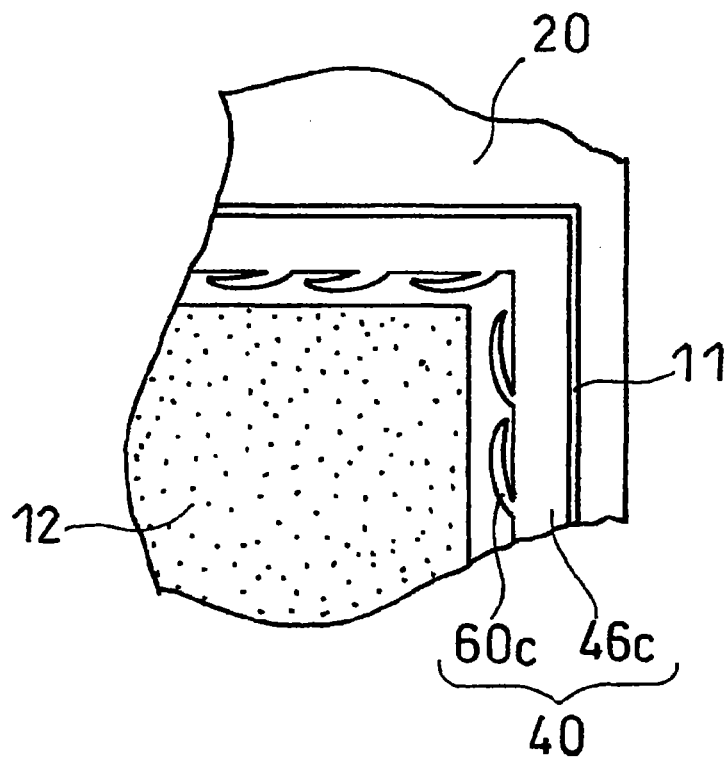
FIG. 6 is a diagram to illustrate the structure of an anode-side sealing member 40 of a fuel cell according to a fourth embodiment.
Figure 7:
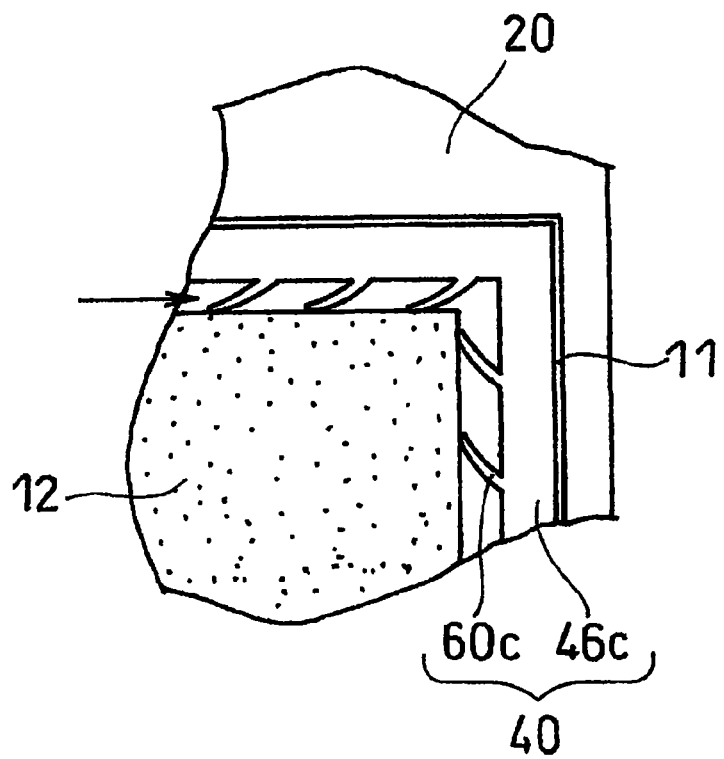
FIG. 7 is another diagram to illustrate the structure of an anode-side sealing member 40 of a fuel cell according to a fourth embodiment.
Figure 8:
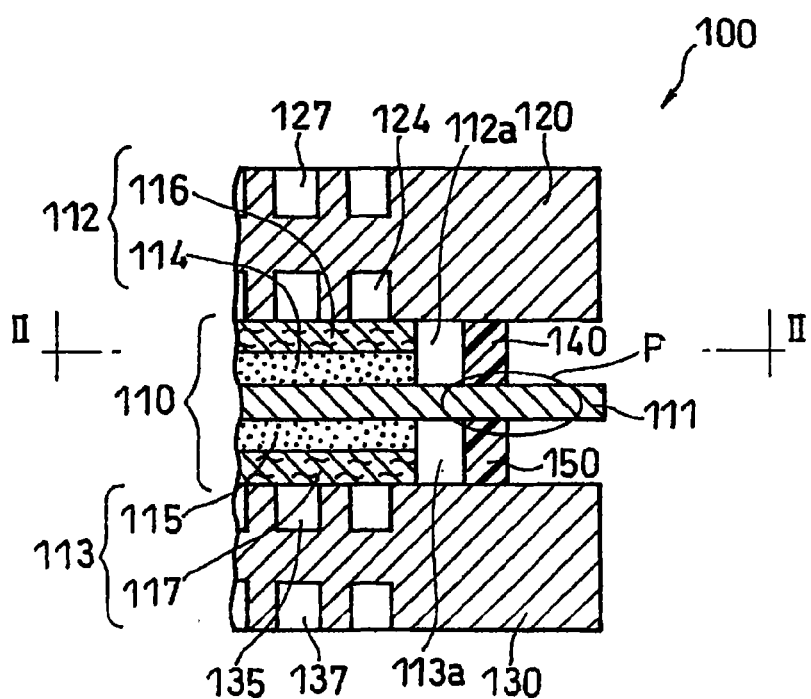
FIG. 8 is a cross sectional view of a relevant part of a basic component (unit cell) of a conventional polymer electrolyte fuel cell.

Hereinafter, the anode-side sealing member included in the fuel cell of the fourth embodiment will be described. FIGS. 6 and 7 are enlarged views of a relevant part of the portion indicated by "II" of FIG. 2, that is, a diagram to illustrate the structure of the anode-side sealing member 40 of the fuel cell according to the fourth embodiment. More specifically, FIGS. 6 and 7 are diagrams to illustrate how the protruding portions of the anode-side sealing member of this embodiment are deformed.

As shown in FIG. 6, the anode-side sealing member 40 of this embodiment comprises an annular body 46c disposed such that the annular body 46c surrounds the anode 12, and a plurality of valve-shaped protruding portions 60c capable of being deformed by having flexibility which are provided on the inner surface of the annular body 46c such that the length direction of the protruding portions 60c is substantially parallel to the surface direction of the inner surface of the annular body 46c. And, as shown in FIG. 7, when the reaction gas flows in the anode-side gap 12a substantially parallel to the surface direction of the inner surface of the annular body 46c as indicated by the arrow in FIG. 7, the protruding portions 60c open upon receiving the reaction gas, and thus the other ends of the protruding portions 60c come in contact with the side face of the anode 12.

The valve-shaped protruding portions 60c can have a thickness equal to or less than that of the annular body 46c.

In other words, the protrusions 60c are deformed upon receiving a flow of fuel gas when the fuel gas flows in the anode-side gap 12a as a bypass, so the protrusions 60c particularly have excellent effect of suppressing the flow. Further, because the protruding portions 60c press the entire side face of the anode 12, the protruding portions 60c also have the effect of allowing the anode 12 to be positioned within the anode-side sealing member 40 in an easy and ensured manner. Particularly, as shown in FIG. 6, the protruding portions 60c are oriented along the inner surface of the annular body 46c when the gas is not flowing, and thus excellent handleability during assembly of MEA 10 or fuel cell 1 is obtained. Although not shown, the cathode-side sealing member 50 also has a structure and function similar to those of the anode-side sealing member 40.

As described above, according to this embodiment, it is possible to provide a polymer electrolyte fuel cell in which reaction gases can be utilized efficiently for electrode reactions even when a gap is formed between the anode-side sealing member 40 and the end face of the anode 12 and between the cathode-side sealing member 50 and the end face of the cathode 13, and sufficient power generation performance can be ensured with a simple constitution.

Further, with the simple constitution as described above, it is possible to provide an anode-side sealing member 40 and a cathode-side sealing member 50 with which a polymer electrolyte fuel cell capable of ensuring sufficient power generation can be achieved in an easy and ensured manner.

Although the embodiments give above describe the case where the sealing member of the present invention is used both as the anode-side sealing member and the cathode-side sealing member, similar effects can be obtained even when the sealing member of the present invention is used either as the anode-side sealing member or the cathode-side sealing member. In addition, the protruding portions may have, for example, a spring-like shape, and in order to ensure the positioning and fixation after the assembly of MEA 10 or unit cell, it is preferable that the protruding portions not only contact the MEA 10 but also press the MEA 10 with a certain level of force.

When the sealing member is produced by a molding method such as injection molding, the protrusions may be formed concurrently with the annular body. It is also possible to form the protruding portions by cutting out with a Thomson die after the production of the annular sealing member. It is also possible to form the protrusions by making efficient use of burrs formed by a resin injection gate when producing the sealing member with a molding method.

Although not mentioned in the above embodiments, the sealing member may be fixed to the separator plate with an adhesive, or the sealing member may be fixed to the separator plate by direct printing or the like. It is also possible to form a groove in the separator and fit the annular body of the sealing member into the groove.

The protrusions exhibit the effect of suppressing the reaction gas flow that flows in the gap and the effect of positioning as long as they have flexibility, but particularly protrusions having a fine structure such as a valve shape, needle shape or hair shape are preferable in terms of production and performance due to ease of production and ease of being fitted in the gap.

The protrusions may be disposed in a direction opposite to a gas flow that flows in the gap, and it is also preferable that the protrusions are configured such that they are deformed upon receiving the gas flow to suppress the gas flow. Accordingly, for example, the protruding portions 60, 60a of the first and second embodiment given above may be provided such that the length direction of the protruding portions 60, 60a intersects at an acute angle with a direction substantially parallel to the inner surface of the annular body 46, 46a, so that the protruding portions open like valves upon receiving the gas flow to suppress the gas flow.

Also, at least one of the anode-side sealing member 40 and the cathode-side sealing member 50 may be combined with the MEA 10 into one piece by, for example, a method such as thermal fusing (hot pressing) or adhesion using an adhesive.

The constitution as described above makes it easy to handle the assembly including the sealing member and the MEA and to produce the fuel cell 1 using the anode-side sealing member 40, the cathode-side sealing member 50, the MEA 10, the anode-side separator plate 20 and the cathode-side separator plate 30. Particularly when both the anode-side sealing member 40 and the cathode-side sealing member 50 are combined with the MEA 10 into one piece, the ease of production of the fuel cell 1 is improved.

The anode-side sealing member 40 may be combined with the anode-side separator plate 20 into one piece by, for example, a method such as thermal fusing (hot pressing) or adhesion using an adhesive. Similarly, the cathode-side sealing member 50 may be combined with the cathode-side separator plate 30 into one piece by, for example, a method such as thermal fusing (hot pressing) or adhesion using an adhesive.

The constitution as described above makes it easy to handle the assembly including the sealing member and the MEA and to produce the fuel cell 1 using the anode-side sealing member 40, the cathode-side sealing member 50, the MEA 10, the anode-side separator plate 20 and the cathode-side separator plate 30.

EXAMPLE

The present invention will be described in further detail below with examples, but it is to be understood that the present invention is not limited thereto.

Example 1

As the MEA, PRIMEA (trade name) (the size of main surfaces of the anode and the cathode: 6 cm×6 cm) available from Japan Gore-Tex Inc. as configured as shown in FIG. 1 was prepared.

The anode-side sealing member (thickness: 280 μm) was produced by forming, in a fluorocarbon rubber sheet, openings which would serve as manifold apertures (fuel gas manifold apertures 22, cooling water manifold apertures 23, oxidant gas manifold apertures 25) and a center opening in which the MEA would be disposed as shown in FIG. 2 by means of punching. The size of the center opening in which the MEA would be disposed was set to 6.2 cm×6.2 cm, which was larger than the main surface of the anode of the MEA.

In other words, the center opening was formed such that the anode-side gap 12a shown in FIG. 1 had a width of 1 mm.

When punching the fluorocarbon rubber sheet to form the center opening (substantially rectangular opening) in which the MEA would be disposed, a plurality of protruding portions (length: about 1 cm, thickness: about 0.1 mm) shown in FIG. 6 were formed such that each side had three protrusions spaced apart at a substantially equal spacing, that is, 12 protrusions in total. The protruding portions were formed such that when a gas enters the anode-side gap 12a, the protruding portions open (deform) to prevent the gas from flowing through the anode-side gap 12a.

The cathode-side sealing member (thickness: 280 μm) was produced by forming, in a fluorocarbon rubber sheet, openings which would serve as manifold apertures (fuel gas manifold apertures 22, cooling water manifold apertures 23, oxidant gas manifold apertures 25) and a center opening in which the MEA would be disposed as shown in FIG. 2 by means of punching. The size of the center opening in which the MEA would be disposed was set to 6.1 cm×6.1 cm, which was larger than the main surface of the cathode of the MEA. No protruding portion was formed in this cathode-side sealing member.

Subsequently, the above MEA was sandwiched by an anode-side separator plate 20 having a gas channel for supplying a fuel gas and a cooling water channel and a cathode-side separator plate 30 having a gas channel for supplying an oxidant gas and a cooling water channel. In this step, the cathode-side sealing member was disposed around the cathode of the MEA, and the anode-side sealing member was disposed around the anode of the MEA. Then, current collector plates and insulating plates were arranged at both ends of the thus-obtained stack including the anode-side separator plate, the MEA and the cathode-side separator plate, which was then interposed between a pair of end plates. The resulting stack was further sandwiched by a pair of heaters, which was then clamped using springs and clamping members (bolts and nuts). The clamping pressure for the MEA was adjusted to be 7 to 10 kgf/cm$^2$ by adjusting the length of the springs. In the manner described above, a unit cell 1 (a polymer electrolyte fuel cell of the present invention) was obtained.

Comparative Example 1

A unit cell 2 (polymer electrolyte fuel cell) having the same constitution as the fuel cell of Example 1 was produced except that, unlike the fuel cell of Example 1, the anode-side sealing member having no protruding portion (the same anode-side sealing member as that of Example 1 except that no protruding portion was formed) was used.

[Evaluation Test]
(1) Aging Process (Activation Process)

The unit cells 1 and 2 obtained in Example 1 and Comparative Example 1 were controlled to have a temperature of 64° C. A mixed gas (volume ratio: 4:1) of hydrogen and carbon dioxide serving as a fuel gas was supplied to the anode-side gas channel, and air was supplied to the cathode-side gas channel. Before supplying the hydrogen gas and air to the unit cell, the hydrogen gas and air were humidified so that they had a dew point of about 64° C., the hydrogen gas utilization rate was set to 75%, and the air utilization rate was set to 40%. Then, each unit cell was operated at a current density of 0.2 A·cm$^{-2}$ for 12 hours for aging.

(2) Cell Output Characteristics Evaluation Test

For the unit cell 1 of Example 1 and the unit cell 2 of Comparative Example 1, limiting fuel gas utilization rate was measured under the following operation conditions. The result is shown in Table 1. As used herein, the "limiting fuel gas utilization rate" refers to the maximum utilization rate of hydrogen gas at which the fuel cell can generate power in a stable manner without causing a voltage drop.

Operation temperature of fuel cell: 64° C.
Fuel gas (H$_2$) utilization rate: ranging from 80 to 95%
Oxidant gas (O$_2$) utilization rate: 40%, fixed
Humidification temperature of fuel gas and oxidant gas: 64° C.

In this evaluation test, the current density was set to 0.2 A·cm$^{-2}$, a mixed gas (volume ratio: 4:1) of hydrogen and carbon dioxide was supplied to the anode-side gas channel, and the hydrogen gas utilization rate was changed between 80 to 95%. Then, the output voltage after 30 minutes from the start of the operation was recorded.

Note that, in this evaluation test, the limiting fuel gas utilization rate was determined for each of the unit cell 1 of Example 1 and the unit cell 2 of Comparative Example 1, and the arithmetic mean was calculated, which was denoted as "limiting fuel gas utilization rate".

TABLE 1

|  | Limiting fuel gas utilization rate (%) |
| --- | --- |
| Example 1 | 95% |
| Comparative Example 1 | 90% |

In Example 1, even when the fuel gas utilization rate was set to 95%, no voltage drop occurred. In contrast, in Comparative Example 1, when the fuel gas utilization rate exceeded 90%, the voltage started dropping.

The result shown in Table 1 clearly indicates that, in the fuel cell of the present invention, namely, the unit cell (fuel cell) of Example 1 of the present invention, the protruding portions formed in the anode sealing member sufficiently suppressed the gas flow into the anode-side gap, and thus the fuel cell of the present invention exhibited a high limiting fuel gas utilization rate and sufficient power generation performance.

It was also found that, in the unit cell of Example 1, even when the fuel gas utilization rate was varied during measurement, no voltage oscillation occurred, whereas in the unit cell of Comparative Example 1, in the entire range of varied fuel gas utilization rate, the voltage was lower than that of the unit cell of Example 1, and the voltage oscillation was large.

INDUSTRIAL APPLICABILITY

According to the polymer electrolyte fuel cell of the present invention, even when a gap is formed between the anode-side sealing member and the end face of the anode and between the cathode-side sealing member and the end face of the cathode, reaction gases can be utilized effectively for electrode reactions, and sufficient power generation performance can be ensured with a simple constitution. For this reason, the polymer electrolyte fuel cell of the present invention is suitable for use as a cogeneration system for home use or a fuel cell mounted in vehicles.

Further, with the use of the sealing member for a fuel cell of the present invention, it is possible to achieve a polymer electrolyte fuel cell in which sufficient power generation performance can be ensured with the simple constitution as described above in an easy and ensured manner, and thus the sealing member of the present invention is suitable for use in a cogeneration system for home use or a fuel cell mounted in vehicles.

The invention claimed is:

1. A polymer electrolyte fuel cell comprising:
   a membrane electrode assembly including a polymer electrolyte membrane having a hydrogen ion conductivity, and an anode and a cathode that sandwich said polymer electrolyte membrane;
   an anode-side separator plate having a gas channel for supplying a fuel gas to said anode, and a cathode-side separator plate having a gas channel for supplying an oxidant gas to said cathode;
   an anode-side sealing member for maintaining air-tightness of an anode-side gap enclosed by an end face of said anode, said anode-side separator plate, said polymer electrolyte membrane and an inner surface of sail anode-side sealing member, said anode-side sealing member being disposed between said anode-side separator and said polymer electrolyte membrane and between an outer periphery of said membrane electrode assembly and the end face of said anode; and
   a cathode-side sealing member for maintaining air-tightness of a cathode-side gap enclosed by an end face of said cathode, said cathode-side separator plate, said polymer electrolyte membrane and an inner surface of said cathode-side sealing member, said cathode-side sealing member being disposed between said cathode-side separator and said polymer electrolyte membrane and between the outer periphery of said membrane electrode assembly and the end face of said cathode,
   wherein at least one of said anode-side sealing member and said cathode-side sealing member comprises: an annular body disposed along said outer periphery of said membrane electrode assembly; and at least one deformable protruding portion provided on an inner surface of said annular body,
   and
   wherein said protruding portion is located in one of said anode-side gap and said cathode-side gap and provided on said inner surface of said annular body such that a protruding direction of said protruding portion and a direction along said inner surface of said annular body intersect with each other, and a length of said protruding portion along said protruding direction is greater than a distance between the inner surface of the annular body and the end face of one of said anode and said cathode.

2. The polymer electrolyte fuel cell in accordance with claim 1, wherein said protruding portion contacts or presses said anode or said cathode in said anode-side gap or said cathode-side gap.

3. The polymer electrolyte fuel cell in accordance with claim 1, wherein said protruding portion has elasticity.

4. The polymer electrolyte fuel cell in accordance with claim 1, wherein said annular body and said protruding portion are combined into one piece.

5. The polymer electrolyte fuel cell in accordance with claim 1, wherein said protruding portion is in a shape of a crescent, valve, needle, spring or hair.

6. The polymer electrolyte fuel cell in accordance with claim 1, wherein said protruding portion is disposed in a direction opposite to a gas flow that flows in said anode-side gap or said cathode-side gap.

7. The polymer electrolyte fuel cell in accordance with claim 6, wherein said protruding portion is configured such that said protruding portion is deformed by said gas flow that flows in said anode-side gap or said cathode-side gap and contacts said anode or said cathode.

8. The polymer electrolyte fuel cell in accordance with claim 1, wherein at least one of said anode-side sealing member and said cathode-side sealing member is combined with said membrane electrode assembly into one piece.

9. The polymer electrolyte fuel cell in accordance with claim 8, wherein said anode-side sealing member and said cathode-side sealing member are combined with said membrane electrode assembly into one piece.

10. The polymer electrolyte fuel cell in accordance with claim 1, wherein said anode-side sealing member is combined with said anode-side separator plate into one piece.

11. The polymer electrolyte fuel cell in accordance with claim 1, wherein said cathode-side sealing member is combined with said cathode-side separator plate into one piece.

12. The polymer electrolyte fuel cell in accordance with claim 10, wherein said cathode-side sealing member is combined with said cathode-side separator plate into one piece.

13. The polymer electrolyte fuel cell in accordance with claim 1, wherein said protruding portion is provided such that said protruding portion deforms by contacting or pressing said anode or said cathode in said gap.

14. The polymer electrolyte fuel cell in accordance with claim 1, wherein said protruding portion deforms such that a gas flow in said gap is suppressed.

15. The polymer electrolyte fuel cell in accordance with claim 1, wherein the anode-side separator plate is in contact with the anode and the cathode-side separator plate is in contact with the cathode.

* * * * *